United States Patent Office 3,489,421
Patented Jan. 13, 1970

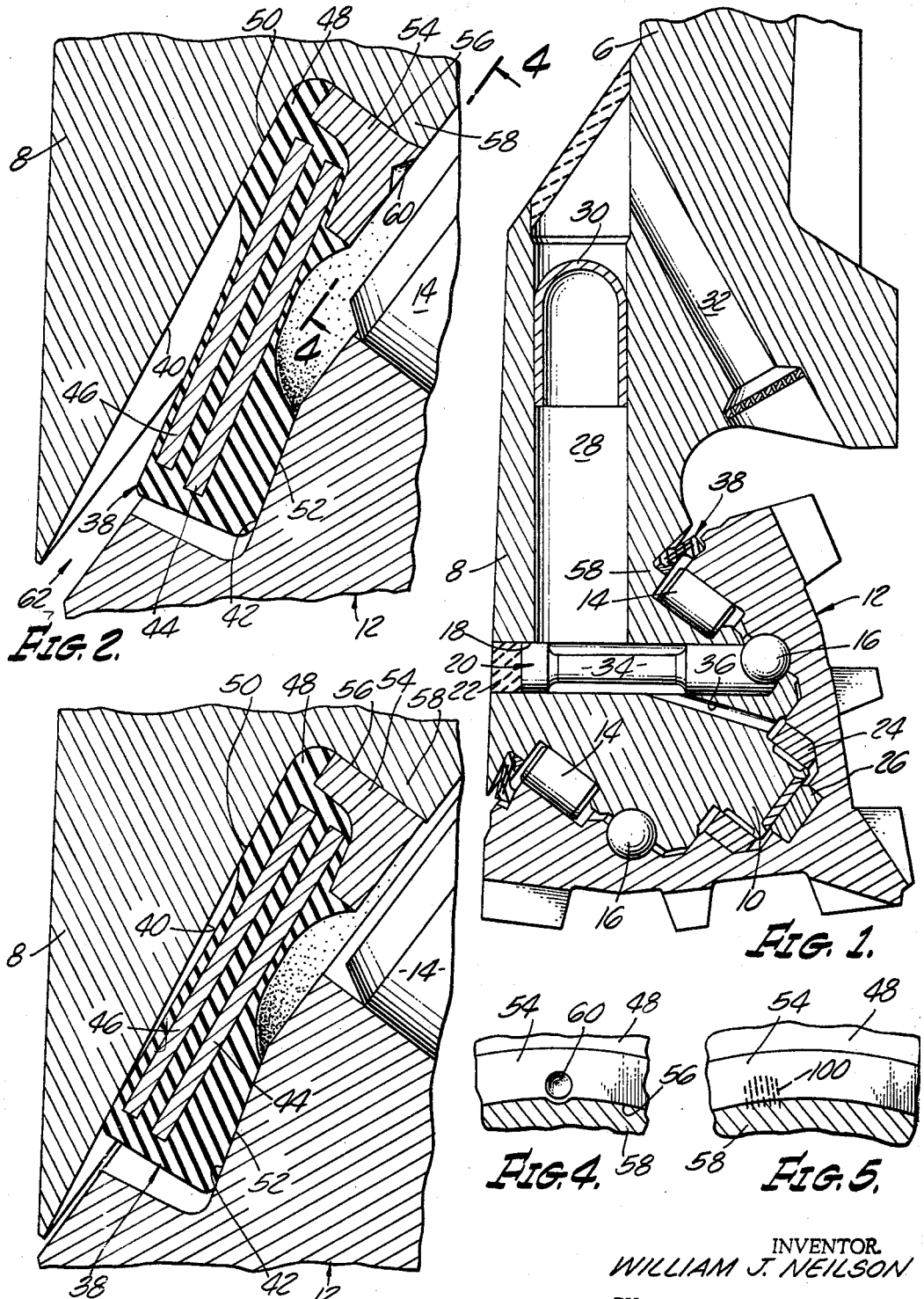

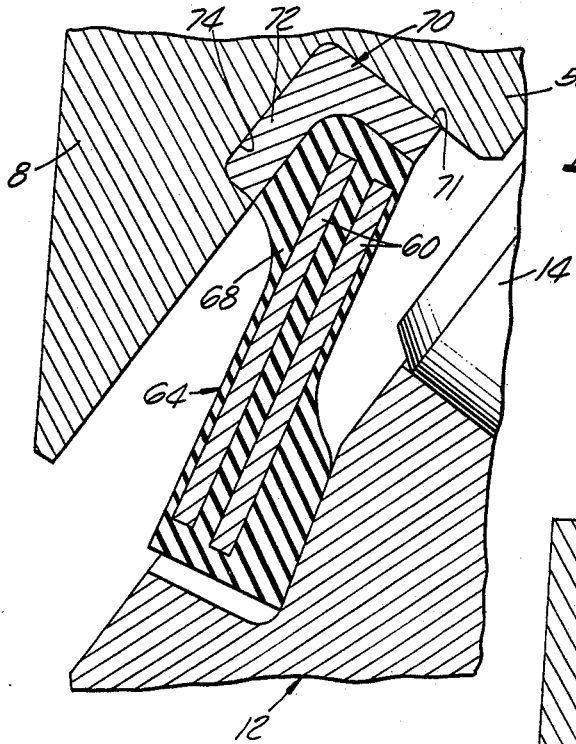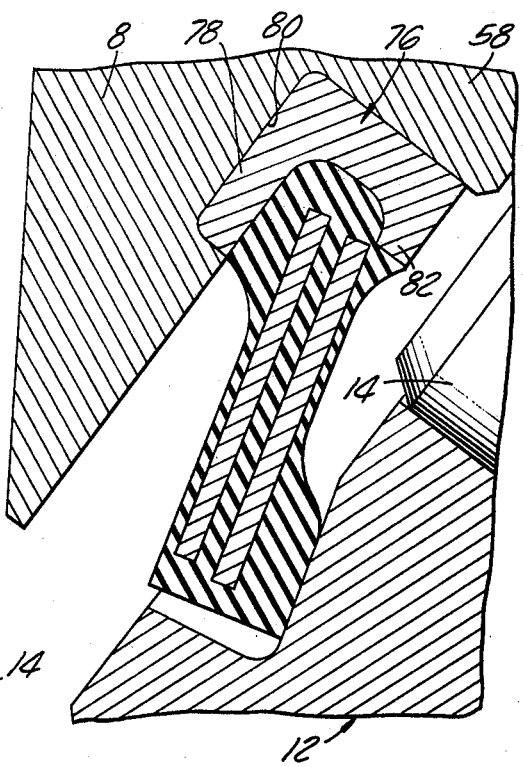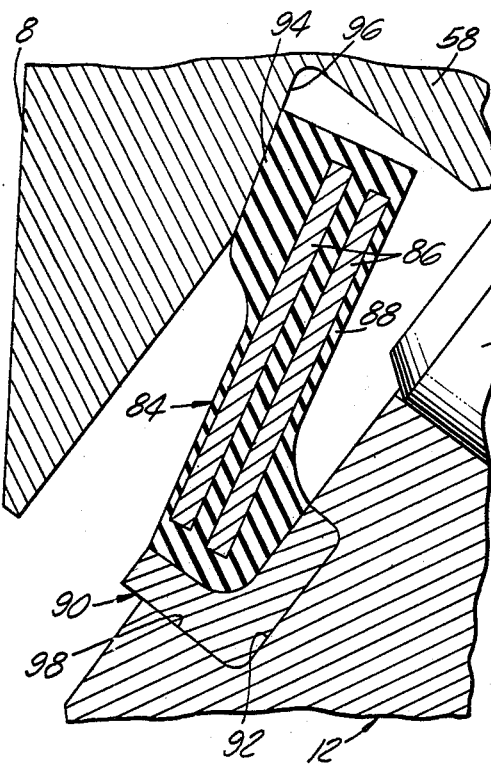

3,489,421
BEARING SEAL
William J. Neilson, Whittier, Calif., assignor to Smith Industries International, Inc., Compton, Calif., a corporation of California
Filed Mar. 23, 1967, Ser. No. 625,356
Int. Cl. F16j 15/34; F16c 19/49
U.S. Cl. 277—95                    2 Claims

ABSTRACT OF THE DISCLOSURE

An annular seal is affixed to one of two relatively rotatable members for creating a seal therebeteen. The inner perimeter of the seal comprises a metal retaining ring having an interference fit on one of the parts to be sealed. Extending generally radially outwardly from the ring in a spring element which may comprise two or more annuli in the nature of Belleville springs which are held by and connected to the retaining ring by a rubber-like material bonded to the spring elements and to the retaining ring. The rubber-like material, in one form of the invention, has a relatively flat annular surface adapted to wipe against the sealing face of one of the relatively rotatable parts and an oppositely facing surface adapted to seal against the other of the relatively rotatable members in nonmoving relation thereto. In another form the retaining ring, which is a diameter to have an interfering fit with the hub of the one rotating part, lies in a groove formed in said one rotating part and the rubber-like material is provided with a sealing surface adapted to engage a face of the other rotatable part.

---

In my copending application Ser. No. 480,439, filed Aug. 17, 1965, now Patent No. 3,381,968, entitled Bearing Seal, I have disclosed a seal construction comprising two or more spring elements, annular in shape and of the Belleville type which are embedded in a rubber-like material having wiping sealing surfaces facing axially in opposite directions to seal opposed relatively rotatable sealing surfaces of parts to be sealed, such as the bearing of rotary rock bit cutters. In that application, the seal is tightly fitted upon a hub, but while rotation is curtailed by such interference fit, the seal may, under some circumstances, rotate relative to either or both of the relatively rotatable bearing parts, since that portion of the seal contacting the hub is formed of rubber, which of course is a yileding material.

The present invention has an object the provision of a seal of the journal type set forth above wherein the annular spring elements are embedded in a rubber-like sealing material and the inner peripheral portion of the rubber-like seal is bonded to an inner peripheral retaining ring of metal, which in turn is mounted upon the hub of one of two relatively rotatable bearing parts with an interference fit. With the metal ring in interference fit with the hub, the seal does not rotate relative to the bearing part having the hub and upon which the seal is mounted. The rubber-like material is provided with a wiping sealing surface facing axially away from the bearing part upon which the seal is mounted with an interference fit and this wiping surface is so disposed that it is not subjected to any substantial degree to the working of drilling mud, rock particles or the like, between it and the relatively rotatable bearing surface against which it wipes, with the result that the seal of this invention is capable of longer wear.

The above and other objects of the invention will more fully appear from the following description in connection with the accompanying drawings:

FIG. 1 is a partial view in vertical section of a portion of a roller rock bit incorporating an embodiment of my seal;

FIG. 2 is an enlarged fragmentary sectional view through the seal and adjacent portions of a rock bit with the seal in a relatively relaxed condition;

FIG. 3 is a view similar to FIG. 2 but with the rock bit bearing faces closer together and the seal under a greater degree of axial compression;

FIG. 4 is a sectional detail taken approximately on the line 4—4 of FIG. 2;

FIG. 5 is a view similar to FIG. 4 showing a different manner of anchoring the seal;

FIG. 6 is a view similar to FIG. 2 showing a modified form of seal;

FIG. 7 is a view similar to FIG. 6 illustrating another modification; and

FIG. 8 is a similar view of FIG. 6 of still another form of seal.

In FIG. 1 there is shown a bit body 6 having a downwardly and inwardly inclined journal 10 upon which a rotary rock bit cutter 12 is mounted. Conventional antifriction bearings 14 and 16 are disposed around journal 10 for rotatable mounting of cutter 12 thereon. Ball bearings 16 are introduced through a conduit opening 18 which is later closed by a plug 20 held in place by a weld 22. There may also be provided anti-friction bearings 24 and 26.

It is also customary to provide a lubricant reservoir 28 in which is a movable diaphragm 30 subject to pressure on its top, which is equivalent to the ambient fluid pressure existing the well around the bit and which is conducted thereto through one or more passages 32. Lubricant in the reservoir 28 is conducted around a neck 34 in the plug 20 to a passage 36 in the journal 10 and lubricant is thus supplied to the bearnigs between the journal 10 and the cutter 12.

A seal 38 comprising one embodiment of the invention, has an annular spring ring disposed outwardly of the roller bearings 14 lying between the end of the cutter 12 and continuously about an annular surface 40 of the leg 8, which annular surface surrounds the base of the journal 10. This seal 38 is intended primarily to confine the lubricant in the bearings, although a small amount may be permitted to escape and this condition is frequently desirable. However, it is important that the seal exclude drilling mud laden with rock cuttings which would materially shorten the life of the anti-friction bearings of the cutter.

Frequently the opposed surfaces 40 on the leg 8 and 42 on the end of the cutter 12 are not only substantially parallel to each other but are in planes perpendicular to the longitudinal axis of the journal 10 and the cutter 12. However, it is preferred that the arrangement be used as disclosed in my prior U.S. Patent No. 3,096,835, issued July 9, 1963 wherein the opposed surfaces 40 and 42 on the leg and cutter respectively are arranged in planes having an angular relationship to the longitudinal axis of the journal 10, which permits an increase in the length of the roller bearings 14. The seal of the present invention however can be used regardless of the specific relationship to the faces 40 and 42 to the axis of the journal.

The seal 38 includes an annular laminated spring core of preferably two dished spring elements 44 and 46, somewhat in the nature of Belleville springs, and are preferably formed of spring steel or other equivalent material. The spring elements 44 and 46 are spaced apart and are embedded in a molded annulus 48 of a rubberlike material which is bonded to said spring elements. The rubber-like material need not completely enclose the spring elements 44 and 46 but complete covering is preferable due to simplicity of manufacture.

The rubber-like material 48 is molded to provide annular pads or flanges 50 and 52 which are adapted to bear against the surfaces 40 and 42 of the part to be sealed. About the inner periphery of the seal 38 is a ring 54, preferably of metal, which contacts and is bonded to the rubber-like material 48. The retaining ring 54 has an inner annular wall portion which is of slightly less diameter than that of a hub portion 58 which is an integral part of the journal 10 at the point where said journal extends from the bit body leg 8.

The retainer ring 54 is pressed upon the hub 58 with an interfering fit and said ring may be more firmly anchored to the hub by staking, punching or similar local displacement of the metal of the ring as at 60 in FIGS. 2 and 4. This will hold the retainer ring 58 firmly on the hub and also will hold the rubber pad 50 in firm stationary sealing engagement with the face 40 on the leg 8. However, the pad 52, which is shown contacting the face 42 on the cutter 12, is a wiping face providing a lubricant seal against the cutter face 42 which rotates relative to the entire seal 38 and the leg 8.

In FIG. 2, the seal 38 is shown in a more or less relaxed condition with the drill bit leg 8 and the cutter 12 relatively widely separated. In FIG. 3 the leg 8 and cutter 12 are shown closer together and the seal 38 is shown pressed to a more nearly flat condition. These two views illustrate the effectiveness of the sealing contact as the cutter assembly wears and the cutter 12 comes closer to the bottom of the leg 8.

As is well known in the art, rock bits of this type operate in drilling mud which is forced down through the drilling string and a passage through the center of the bit so that the space 62 is filled with drilling mud and rock cuttings which eventually are carried off by the mud. Due to the fact that the retainer ring 54 is firmly held on the hub 58 with an interference fit and the pad 50 of the rubber-like material 48 is held firmly against the bearing face 40 of the leg 8, it is practically impossible for drilling mud and cuttings to work up around the hub 58 and into the lubricant passage adjacent the roller bearings 14. While cuttings and mud have access to the outer periphery of the rubber-like annulus 48, the resiliency of the spring element 44 and 46 cause pressure of the pad 52 against the face 42. Inasmuch as the lubricant pressure inside the cutter 12 is maintained substantially equal to the drilling mud pressure externally of the cutter and the seal 38, the chances of drilling mud and cuttings working past the pad 52 are minimized. Furthermore, the likelihood of mud and cuttings working past the seal 38 is reduced by half because the seal is held firmly on the hub 58 of the leg 8 and the seal cannot move relative to said leg 8; whereas, in prior seals, including that of my above-identified copending application, the seal could under some conditions, such as prolonged use, rotate relative to both the leg and the cutter.

In FIG. 6, there is shown a modified form of seal 64. Seal 64 includes Belleville spring elements 66 and a rubber-like body 68 in which the spring elements 66 are embedded and to which they are bonded, and it also includes a retainer ring 70. In this form of the invention, the ring 70 is substantially L-shaped in cross section and has an inner annular peripheral surface 71 which has an interference fit with the hub 58. The flange 72 of the retaining ring 70 is positioned in an annular groove 74 in the leg 8 and about the base of the hub 58. The retaining ring flange 72 will be held tightly against the bottom of the groove 74 in the drill body leg 8 in the same manner that the rubber pad 50 is held against the face 40 in the first described embodiment. Otherwise, the structures and arrangement of the seal is the same as that of the former embodiment.

In FIG. 7, there is shown still another form of seal, the difference being in the retaining ring 76. It has a flange 78 lying in a groove 80 in the same manner as the flange 72 and groove 74 of FIG. 6. However, in FIG. 7 the retaining ring 76 has another flange 82 which is spaced from and generally parallel to the flange 78 so that the retaining ring 76 is in effect made up of three webs; whereas, those of FIG. 6 and FIG. 2 are made up of two webs disposed in L-shaped relationship. The additional web or flange 82 in FIG. 7 is provided to give added strength to the retaining ring 76 and also to more firmly anchor the rubber-like material in and to the retaining ring.

In FIG. 8 there is shown a seal ring 84 having a pair of Belleville springs 86 in a body 88 of rubber-like material. However in this form there is provided a metal retaining ring 90 which lies about the outer periphery of the seal as distinguished from the previously described retaining rings which are located about the inner peripheries of their respective seals. The retaining ring 90 in FIG. 8 has a portion lying in a groove 92 similar to the grooves 74 and 80 in FIGS. 6 and 7, which latter grooves of course are located in the leg 8; whereas, the groove 92 is located in the cutter 12. The sealing ring 82 has a pad 94 which is in wiping contact with an annular surface 96 on the leg 8. The retaining ring 90 is pressed into the groove 92 with an interference fit with the annular wall 98 formed in the cutter 12 so that the seal is held firmly by the cutter 12 against rotation relative thereto.

In order to more firmly anchor the retaining ring 90, it may be staked as indicated at 60 in FIG. 4, or it may be tacked as at 100 by welding methods well known, so that the retaining ring 54 is actually welded at several points to the cutter 12. While normally securing the metal retaining ring to a hub or within an anular groove, such as in FIG. 1, or in an annular groove as in FIG. 8, will securely hold the metal retaining ring and prevent it from rotating relative to the part with which it has an intreference fit, one or more stitch welds, such as the weld 100 in FIG. 5, eliminate all possibility of rotation of the retaining ring and the seal bonded thereto. When the retaining ring is anchored by welding, it should be understood that an interference fit need not necessarily be employed, since the weld is strong enough to hold the retaining ring against movement of any kind, but the preferred practice is to provide the interference fit and a weld when such welding is utilized.

I claim:

1. In an assembly including relatively rotatable parts on an axis of rotation and having opposed faces in planes across said axis, a seal for use between said opposed faces, one of which parts has a circular wall about said axis of rotation, and wherein there is an annular resilient element of seal material which, in its relaxed condition, has its outer edge axially displaced relative to its inner edge and which is adapted to become loaded by the application of an axial force tending to bring the outer and inner edges of the seal into the same plane, wherein the improvement comprises: an annular metallic retaining ring having the resilient element bonded thereto about one edge portion of the resilient element, the retaining ring lying about and having an annular portion interferingly fitted in sealing contact on one of said relatively rotatable parts, said resilient element, in a relaxed position, having a relatively free annular edge portion with a wiping face disposed transversely of said axis of rotation and in sliding contact with one of said opposed surfaces, and said metallic retaining ring having a welded connection with the relatively rotatable part upon which it is interferingly fitted.

2. The structure in claim 1, and at least a pair of welds at spaced points about said retaining ring and relatively rotatable part.

References Cited

UNITED STATES PATENTS

| | | | |
|---|---|---|---|
| 2,478,649 | 8/1949 | Wightman | 277—95 X |
| 2,797,067 | 6/1957 | Fisher | 277—95 X |
| 3,370,895 | 2/1968 | Cason | 277—95 X |

FOREIGN PATENTS 1,071,374  3/1954  France.

LAVERNE D. GEIGER, Primary Examiner

J. S. MEDNICK, Assistant Examiner

U.S. Cl. X.R.

277—235